United States Patent
Schöning

(10) Patent No.: US 9,697,072 B2
(45) Date of Patent: Jul. 4, 2017

(54) SELF-CORRECTING COMPLEX EVENT PROCESSING SYSTEM AND CORRESPONDING METHOD FOR ERROR CORRECTION

(71) Applicant: SOFTWARE AG, Darmstadt (DE)

(72) Inventor: Harald Schöning, Dieburg (DE)

(73) Assignee: SOFTWARE AG, Darmstadt (DE)

( * ) Notice: Subject to any disclaimer, the term of this patent is extended or adjusted under 35 U.S.C. 154(b) by 83 days.

(21) Appl. No.: 14/525,737

(22) Filed: Oct. 28, 2014

(65) Prior Publication Data
US 2015/0121175 A1    Apr. 30, 2015

(30) Foreign Application Priority Data
Oct. 28, 2013 (EP) ..................................... 13190497

(51) Int. Cl.
*G06F 11/10* (2006.01)
*G06F 11/07* (2006.01)
*H04L 12/24* (2006.01)

(52) U.S. Cl.
CPC .......... *G06F 11/10* (2013.01); *G06F 11/0706* (2013.01); *G06F 11/0793* (2013.01); *H04L 41/0806* (2013.01)

(58) Field of Classification Search
CPC .. G06F 11/10; G06F 11/0706; G06F 11/0793; G06F 11/14; G06F 11/00; G06F 9/46; G06F 7/00; G06F 17/30; G06F 19/00
See application file for complete search history.

(56) References Cited

U.S. PATENT DOCUMENTS

| | | | |
|---|---|---|---|
| 6,636,990 B1 | 10/2003 | Wadewitz | |
| 7,457,728 B2 | 11/2008 | Chen et al. | |
| 7,676,461 B2 | 3/2010 | Chkodrov et al. | |
| 7,757,120 B2* | 7/2010 | Ogle | ................... G06F 11/0748 714/25 |
| 2005/0172162 A1 | 8/2005 | Takahashi et al. | |
| 2005/0188240 A1 | 8/2005 | Murphy et al. | |
| 2008/0320326 A1 | 12/2008 | Akiyama et al. | |
| 2009/0070425 A1* | 3/2009 | Heumesser | ........... H04L 41/082 709/205 |
| 2009/0125550 A1 | 5/2009 | Barga et al. | |
| 2011/0283239 A1* | 11/2011 | Krishnan | ............ G06F 11/3636 715/853 |

(Continued)

OTHER PUBLICATIONS

D. Luckham et al., "Event Processing Glossary—Version 1-1", Event Processing Technical Society, Jul. 2008, 19 pages.

(Continued)

*Primary Examiner* — April Y Blair
*Assistant Examiner* — Rong Tang
(74) *Attorney, Agent, or Firm* — Nixon & Vanderhye PC

(57) ABSTRACT

Certain example embodiments relate to a complex event processing, CEP, system, including an error correction component configured to receive a stream of events including at least one event from at least one event source. The error correction component is configured to detect at least one error in the at least one event. The error correction component is configured to emit a corrected stream of events including at least one event, which can then be processed by at least one event processing application.

16 Claims, 2 Drawing Sheets

(56) References Cited

U.S. PATENT DOCUMENTS

| | | | |
|---|---|---|---|
| 2012/0158360 A1* | 6/2012 | Cammert | G06F 17/30516 |
| | | | 702/179 |
| 2012/0310850 A1* | 12/2012 | Zeng | G06N 5/02 |
| | | | 705/317 |
| 2013/0031567 A1 | 1/2013 | Nano et al. | |
| 2013/0339984 A1* | 12/2013 | Grumann | G06F 11/0715 |
| | | | 719/318 |
| 2014/0236983 A1* | 8/2014 | Alves | G06F 17/30548 |
| | | | 707/769 |
| 2014/0237289 A1* | 8/2014 | de Castro Alves | G06F 11/202 |
| | | | 714/11 |
| 2014/0350888 A1* | 11/2014 | Gesmann | G06F 11/30 |
| | | | 702/183 |
| 2015/0227415 A1* | 8/2015 | Alves | G06F 11/202 |
| | | | 714/15 |

OTHER PUBLICATIONS

A. Artikis et al., "Event Processing Under Uncertainty", DEBS '12, Jul. 16-20, 2012, pp. 1-12.
G. Sharon et al., "Event Processing Network—A Conceptual Model", VLDB '07, Sep. 23-28, 2007. pp. 1-8.
U.S. Appl. No. 13/928,842, filed Jun. 27, 2013, Gesmann.

* cited by examiner

SELF-CORRECTING COMPLEX EVENT PROCESSING SYSTEM AND CORRESPONDING METHOD FOR ERROR CORRECTION

This application claims the benefit of European 13 190 497.1, filed Oct. 28, 2013, the entire content of which is hereby incorporated herein by reference.

1. TECHNICAL FIELD

Certain example embodiments relate generally to complex event processing, CEP, and more particularly to a self-correcting CEP system and to a corresponding method for error correction.

2. BACKGROUND AND SUMMARY

Complex computing systems are nowadays oftentimes implemented based on the so-called "event-driven architecture" (EDA), which is a software architecture pattern promoting the production, detection, consumption of and reaction to events. Such systems are also called "Event Processing Networks" (EPN) (cf. "Event Processing Network—A Conceptual Model" of Sharon et al., VLDB'07, Sep. 23-28, 2007, Vienna, Austria, and "Event Processing Under Uncertainty" of Artikis et al., DEBS'12, Jul. 16-20, 2012, Berlin, Germany). The EDA pattern may be applied in the implementation of applications and systems which transmit events among loosely coupled software components and/or services. The terminology used in the present application adheres to the terms used in the "Event Processing Glossary—Version 1.1" by the Event Processing Technical Society (Editors: David Luckham, Roy Schulte, July 2008).

Figure 1:
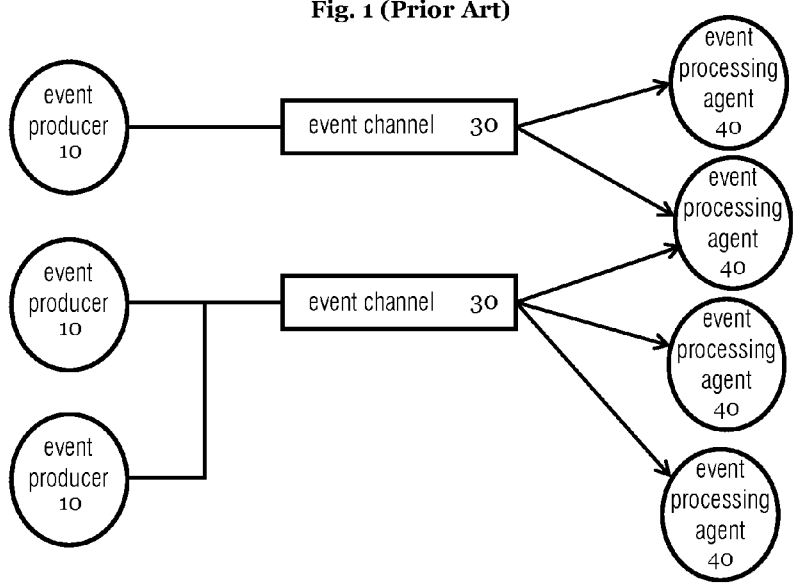

An event processing network (EPN) describes the event processing flow execution and is generally illustrated in FIG. 1 in a simplified form. The exemplary EPN comprises event producers 10 (or event sources 10), one or more event channels 30 forming an event bus, and event processing agents 40 (EPAs). The network might further comprise one or more event consumers (not shown in FIG. 1).

Generally, event processing typically follows the pattern of continuous queries, i.e. queries that execute for an infinite time on always changing data (so called event streams), comprising events. Such event streams, often exist in real-world scenarios, e.g. temperature readings from sensors placed in warehouses or trucks, weather data, entrance control systems (where events are generated whenever a person enters or leaves) etc. The input events comprise attributes such as values of temperature readings (also called payload) and metadata e.g. a creation date, a validity period, and a quality of the event (typically comprised in a header of the event). As shown in FIG. 1, event streams, comprising input events, are derived from respective event sources 10. The event channel 30 (or event channels) provides an interface between the event sources 10 and the EPAs 40. The event channel 30 is typically implemented by an event bus. The event channel 30 organizes and combines the event streams for further transmission to the EPAs 40. The EPAs 40 are also known as event mediators and are in charge of tasks such as pattern detection, processing of selected event streams satisfying the pattern, and generating and emitting derived events or streams of events. Typically, all possible events occurring in an EPN are schematically described by event types (comparable to table definitions in relational databases). Event types can e.g. represent raw events and/or derived events. Channels 30 and event types are orthogonal concepts: channels may comprise events of several event types, events of the same event type might be communicated via different channels 30. The events might be represented in XML format. For example, an event originating from a temperature sensor reading in a moving vehicle (e.g. a truck transporting temperature-sensitive goods) could be represented in the following manner:

```
<TempReading
xmlns="http://softwareag.com/eventtypes/temperaturere
ading">
  <header valid-from="20130822:10:59:00" valid-
  to="20130822:11:00:00"/>
  <payload>          <truckId>59834</truckId>
                     <temperature>7.6</temperature>
                     <location>
                         <lat>48.200000</lat>
                         <lon>16.260000</lon>
                     </location>
  </payload>
</TempReading >
```

Consumers (not shown in FIG. 1) have the responsibility of applying a reaction as soon as an event they consider relevant is presented. In summary, building applications and systems around an EDA allows these applications and systems to be constructed in a manner that facilitates more responsiveness, because event-driven systems are, by design, more normalized to unpredictable and asynchronous environments.

Complex event processing (CEP) is a technique of processing events to create complex events, wherein a complex event is an event that is an abstraction (aggregating, summarizing, representing, denoting) of events or sets of events that fit a pattern. In CEP, the queries are comparatively fixed and fed with continuously arriving streams of data (input events or raw events). CEP queries (also referred to as "continuous queries") typically correlate multiple input data items, look for patterns and produce output events (or derived events) when a certain pattern is observed. The CEP queries are often formulated in a SQL-like query language, which is enhanced by CEP specific clauses, such as windows or range clause to define conditions and are typically executed by said EPAs.

In contrast to database systems which run queries once on a certain state of the data, CEP systems do continuous query execution on streams, i.e. a query is essentially evaluated "forever". This allows CEP systems to spend much more effort on query optimization, as query compilation occurs only once unless the query is modified. On the other hand, CEP systems need a mechanism for "hot redeployment" of queries to cope with changes in queries.

In summary, CEP applications have to deal with highly transient event data that arrives continuously at very high rates and have to produce the corresponding output events/alerts as soon as possible, ideally nearly in real-time. This includes push-based processing (also known as data driven processing) preferably within main memory, which denotes a data flow approach where data to process is not requested (pulled) by the processing operator on demand or using certain scheduling techniques, but is directly provided (pushed) to the processing operator when it becomes available. The U.S. Pat. No. 7,676,461 B2 and U.S. Pat. No. 7,457,728 B2 provide further background information about complex event processing (CEP).

Further, it is known that event processing has to deal with huge amounts of data which has to be processed, referred to as "big data". The term "big data" is characterized by several factors. The factor veracity ("data in doubt") is becoming increasingly important. Veracity is defined as the uncertainty in data. In other words, the input event streams carry inherent uncertainties, such as incomplete or inaccurate data streams. For example, a temperature sensor continuously determining temperature readings may be damaged by certain circumstances, where this might result in wrong temperature readings and therefore in erroneous values. Hence, the input events produced by this device which comprise the respective values are incorrect as well. In this context, those skilled in the art will appreciate that such handling of inherent uncertainties and/or erroneous or faulty data is a difficult task given the huge amount of data to be processed in a correct and efficient manner.

For example, consider an event-based system that operates a control system in an aircraft for controlling distinct operations, such as the landing of the aircraft. The control system might continuously receive a large amount of input events, each comprising a plurality of current parameters or attributes, such as GPS coordinates, height of the aircraft and speed of the aircraft. The control system is programmed to start a controlled landing if the parameters reach a predetermined threshold. This might be particularly achieved by applying a specific landing configuration. If the configuration comprises incorrect events and parameters, this might lead to catastrophic consequences. For example, the aircraft may touch the ground too early, with high speed beyond the landing strip, thereby resulting in a plane crash in the worst case.

Therefore, various approaches have been proposed in the prior art for dealing with inherent uncertainty in event processing. The prior art document "Event Processing Under Uncertainty" of Artikis et al. (DEBS'12, Jul. 16-20, 2012, Berlin, Germany) provides a comprehensive overview of types of uncertainty, uncertainty representation and uncertainty handling for event processing systems. In particular, two uncertainty handling methods have been proposed: uncertainty propagation and uncertainty elimination, as will be explained in the following. In uncertainty propagation, the uncertainty/uncertainties in input events is/are propagated to the derived events. However, the first prior art solution has the disadvantage that the uncertainty has to be handled in the expressions which are commonly defined in event processing, particularly in the queries of the EPAs. The expressions comprise for example arithmetic functions and logical operators. The first prior art approach particularly suggests to adapt the defined expressions in a complex manner. For example, the expressions are overloaded or extended to accommodate stochastic values, such that stochastic expressions would evaluate to a distribution over a certain domain.

Contrary, elimination of uncertainty suggests removing the uncertainty before derivation, for example by replacing uncertain attributes by deterministic equivalents and screening out uncertain events according to predefined policies. The second prior art solution suggests in particular using probabilistic functions in the expression of the EPAs.

This elimination approach has the disadvantage of losing crucial information. It is well reported that processing of specific and reduced subsets of data leads to a reduced accuracy and completeness of results.

However, both prior art approaches achieve the uncertainty handling in the EPAs themselves, since error correction and in particular the complex adaptations to expression/queries are defined in the EPAs. In other words, each EPA has to be aware of the various types of errors that might occur and has to provide respective error handling measures.

Other approaches do not adapt the expressions in the EPAs at all. The inherent uncertainties of event streams are irrespectively incorporated in event processing or derivation, resulting in uncertain derived events. Since the whole set of input events, comprising correct as well as incorrect input events, are subject to processing, the EPAs cannot perform reliably and efficiently. Complex and time-consuming prior art approaches, for example the U.S. patent application publications 2009/0125550 A1 and 2013/0031567, are directed to a technique called "retraction" to deal with such uncertain derived event data. Retraction can be considered as a way of performing speculative execution. In the case that output or derived event streams turn out to be incorrect, the processor (in particular the EPA) can retract the incorrect event data and resend the correct event data. This way, the event processing system is slowed down by the process of retraction since the retracted event data has to be retreated and processed again.

In other words, the developer of each event based application has to be aware of uncertainties and possible errors and has to consider these in his event stream processing programs/queries, which is a considerable burden and prohibits fast and slim event processing application development. In addition, erroneous events could lead to system problems (e.g. a CEP system might cease operation if it encounters out-of-time-sequence events).

It is therefore the technical problem to provide an event-based correcting system which removes incorrect event data without losing crucial information and without complex adaptations to a given CEP system, but at the same time performing in an efficient and scalable manner, thereby at least partly overcoming the above explained disadvantages of the prior art.

This problem is according to one aspect solved by a complex event processing, CEP, system. In the embodiment of claim 1, the CEP system (1) comprises:

a. an error correction component (20), adapted for receiving a stream of events comprising at least one event from at least one event source (10);

b. wherein the error correction component (20) is adapted for detecting at least one error in the at least one event; and c. wherein the error correction component (20) is adapted for emitting a corrected stream of events comprising at least one event, which can then be processed by at least one event processing application (40).

Accordingly, the embodiment defines a CEP system for detecting and correcting erroneous input events in event streams (wherein a stream of events is defined as a sequence of zero or more events), in particular in "big data". To this end, the CEP system comprises an error correction component which is decoupled from the prior art-EPAs. Further, the implementation and/or configuration of the error correction component might be also decoupled from the prior art-EPA queries, as will be explained further below. Importantly, the error correction component consumes input events (comprised in a stream of input events) which are derived from the event sources, and is capable of detecting various error types in the input events. For example, an input event might be completely missing in the continuous sequence of input events or an error in an input event might have occurred, as will be explained further below. If an error is detected by the error correction component, the error is handled directly by the error correction component itself ("self-correcting mechanism"). This way, a corrected stream of events is produced by the error correction component, which is then emitted for further processing. Particularly, the corrected event stream can serve as input for event processing applications, such as EPAs.

As it is known in the prior art, the uncertainty handling and respective adaptations to the expressions are commonly defined in the EPAs. In other words, the EPAs in the prior art receive both, correct and incorrect, input events. Hence, the EPAs have to deal with uncertainty handling as well as processing of a huge amount of erroneous data. To the contrary, certain example embodiments allow for decoupling the task of error detection and correction from the EPAs. Particularly, the erroneous events are no longer transmitted to the EPAs since these events are either corrected or excluded before they reach the EPAs, as will be explained further below. This way, the data load and work load is reduced in the EPAs allowing for a reliable and efficient operation by the EPAs.

Although the error correction component might be implemented itself as an EPA, certain example embodiments differ from the prior art approaches in that the error correction component is able to correct errors in input events "upstream" of the actual event processing performed by the EPAs (and preferably even before the events are placed on the event bus of the system). In an embodiment, the error correction component can be connected to an event channel and/or the event processing application which is preferably implemented as at least one second EPA. More specifically, in a preferred embodiment, the error correction component receives input events from the event sources, performs the error correction and transmits the corrected stream of events to an event bus comprising one or more event channels and therefore to at least one second EPA only via the event bus. The event channel(s) e.g. might be a common event bus, facilitating the communication of corrected events between the error correction component and the at least one second EPA. The at least one second EPA preferably differs from the error correction component in that it does not have to bother with the error correction, thereby avoiding the prior art adaptations to queries/expression. In other words, the at least one second EPA is adapted for event processing or any other operations except for error correction or uncertainty handling, such as common prior art-EPAs. Contrary to the prior art-EPAs, the error correction component may be capable of handling distinct event types and error types, such as out-of-sequence events. However, the error correction component does not have to implement and/or understand the query logic of prior art-EPAs.

In one aspect, the error correction component is adapted for detecting the at least one error in the at least one event based on at least one configuration file specifying an expected behavior of the at least one event source, comprising an indication whether time-ordered event delivery is expected, a maximum tolerated event delay time and/or an expected arrival rate of events. Accordingly, the event sources generate input events in a continuous and predictable manner. These input events are expected to be delivered from the event sources and to arrive in accordance with the expected behavior of the event sources. In particular, the input events can be e.g. ordered by time stamps and are expected to be delivered and to arrive in the respective time-ordering. Additionally or alternatively the input events might be delivered with a maximum tolerated delay time and/or arrival rate. This expected behavior of event sources is preferably defined in a configuration file. If the event source does not deliver the expected behavior, the error correction component is capable to generate this expected behavior. This has the advantage that the types of errors to be detected can be defined and managed in a central place, namely the configuration file, in contrast to being scattered among the EPAs, as done in the prior art.

Furthermore, using central configuration file(s) has the further advantage that the error correction can be flexibly adapted to changed circumstances by simply editing the configuration file(s).

In a further aspect, the at least one configuration file further specifies at least one error correction parameter for the at least one event, comprising e.g. an allowed value range, an allowed change rate and/or an expected value distribution. Accordingly, the configuration file further comprises error correction parameters for the input events. For example, a temperature sensor as one example of an event source may determine temperature readings. The temperature is measured in degrees and is e.g. known to have a certain range of degrees. These determined values are essential for error corrections and are comprised as error correction parameters in the configuration file for the input events.

In a further aspect, the at least one configuration file further specifies at least one error correction method to be applied by the error correction component, comprising a reference to a function for calculating at least one corrected event, ignoring at least one event, replacing at least one erroneous value of at least one event with at least one value of a previous event and/or generating at least one interpolated value for at least one event. Accordingly, the configuration file can be used not only for detecting errors and abnormal behavior in the input events by the error correction component, but the configuration file might further comprise instructions on how to correct detected errors. The error correction method is applied on (events of) the input event stream(s), if errors are detected in the input event stream(s). Various types of error correction methods are provided. For example, an error in an input event can be corrected and the corrected event can be emitted by the error correction component. In particular, an error may be corrected with a function for calculating a respective corrected event for further processing. Further, the erroneous event can be completely discarded whenever no correction is required or reasonable and is accordingly not maintained in event processing. Instead of discarding an erroneous event, the previous and/or next events can be incorporated for replacement or interpolation.

Preferably, the at least one configuration file is stored in a repository. Accordingly, the configuration file which is essential for detection and correction of erroneous input events is stored in a central place. This way the computing components in the EPN, particularly CEP system, have access to the configuration file. Importantly, the error correction component as computing component is decoupled from the configuration file itself. In the case of adaptations e.g. the expected behavior of event sources has changed, solely the configuration file has to be updated. This way, the error correction component is not affected by or even aware of the adaptations and the overall configuration of an arbitrarily complex CEP system can be managed in a central location.

In yet another aspect, the at least one configuration file specifies a grouping of events, and wherein the error correction component is adapted for applying an error correction method on the grouping of events. Accordingly, the input events are derived from distinct event sources, wherein an event source comprises sensor readings from distinct sensors of a particular type or group (e.g. temperature sensors). Each of the sensors has a unique ID as grouping criterion. The error correction method is applied on the input events of the same group (with the same group ID). This is particularly advantageous since the expected behavior might differ among distinct groups and the input events are corrected respective to their group.

In a further aspect, the error correction component is further adapted for emitting at least one error event indicating that the at least one error in the stream of events was detected, wherein the at least one error event can be consumed by a monitoring component. Accordingly, distinct event types can be emitted by the error correction component. As mentioned above, a corrected event stream is emitted and preferably transmitted to the EPAs for event processing. Additionally or alternatively, error events can be emitted by the error correction component. The error events comprise information about the errors in the input events, irrespective if they were corrected or not. The error events can be used for monitoring, e.g. by using approaches such as disclosed in the European patent application EP 13169119.8 of applicant. The type of the error event and other details can be configured in the configuration file as well.

Preferably, the at least one event and/or the at least one configuration file is XML based.

In yet another aspect, the error correction component is capable of adapting the at least one configuration file based on the corrected stream of events and/or the at least one error event. Accordingly, the distinct events are essential to gain knowledge about the normal and abnormal behavior in the CEP system. In accordance with the generated events, the configuration file can be adapted to changed behavior, thereby improving the error correction and/or monitoring by the error correction component by means of self-learning.

Certain example embodiments relate to a method for error correction in a CEP system in accordance with the any of the above-described aspects. Lastly, the certain example embodiments provide a computer program (e.g., stored on a non-transitory computer readable storage medium) comprising instructions for implementing the above-described method.

3. BRIEF DESCRIPTION OF THE DRAWINGS

Figure 2:
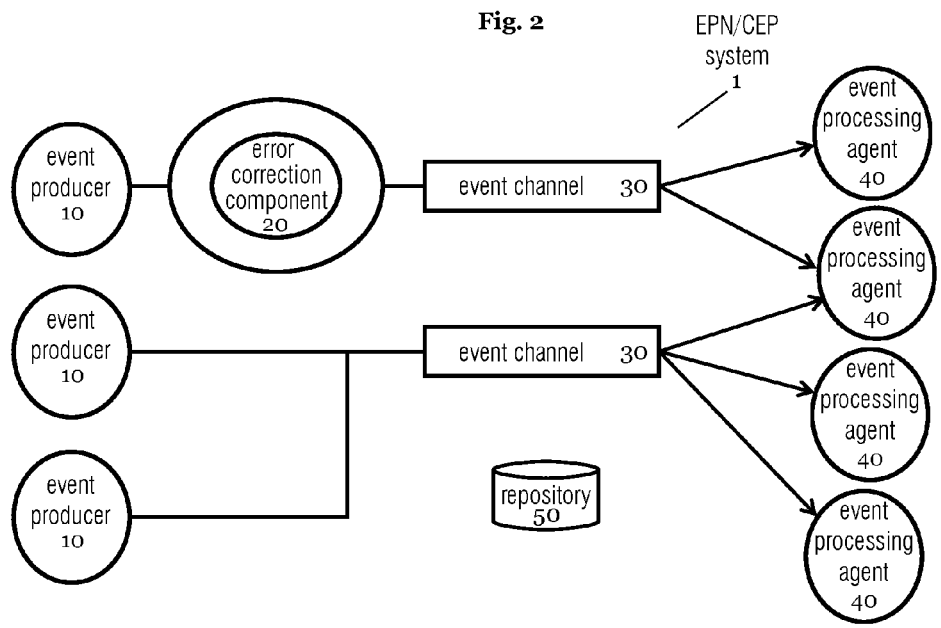
Figure 3:
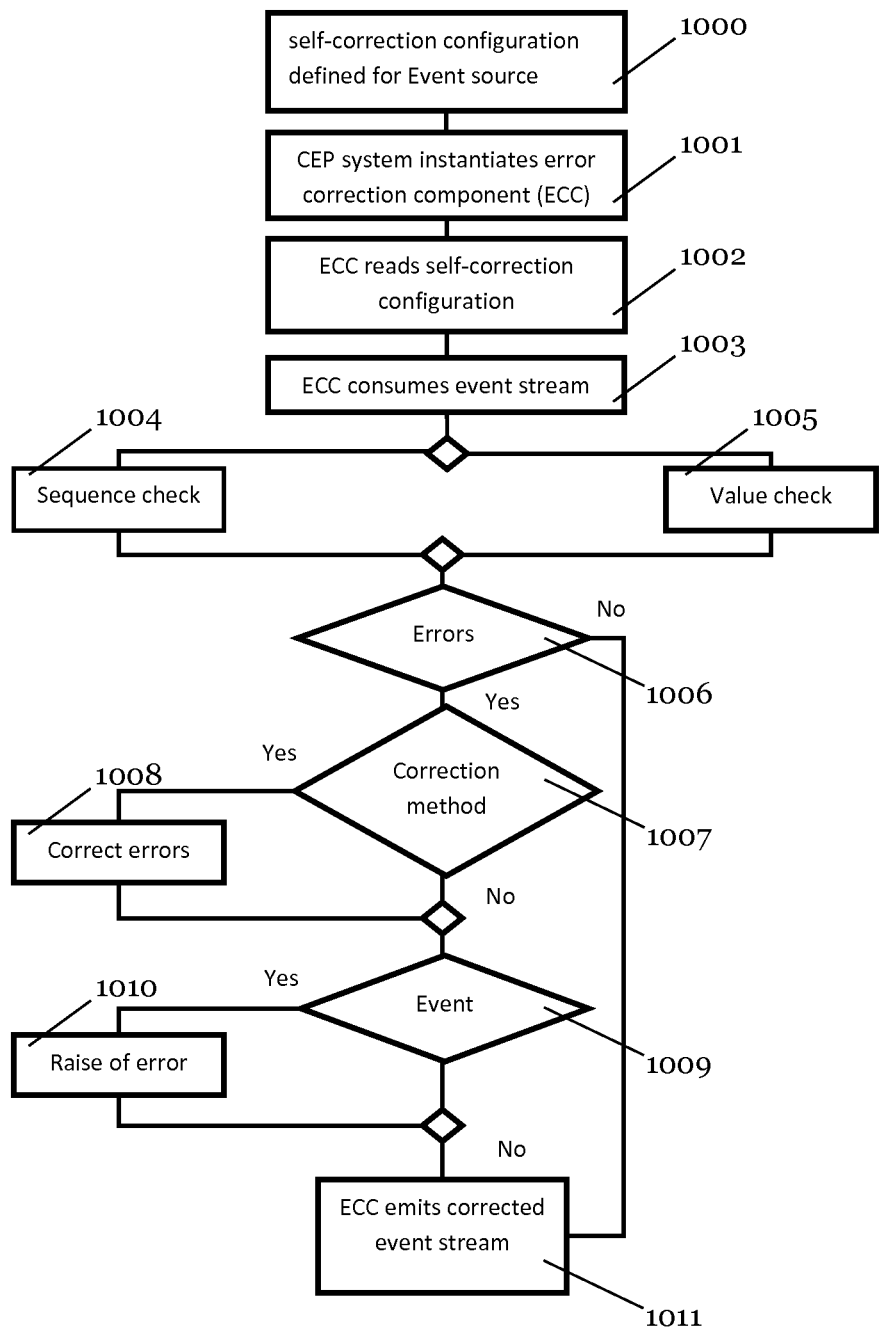

In the following detailed description, presently preferred embodiments are further described with reference to the following figures:

FIG. 1: A schematic representation of a simplified EPN according to the prior art;

FIG. 2: An exemplary EPN comprising an error correction component according to certain example embodiments;

FIG. 3: A flow chart illustrating the flow of execution of the error correction component of FIG. 2 in accordance with certain example embodiments.

4. DETAILED DESCRIPTION

In the following, a presently preferred embodiment is described with respect to an error correction component as schematically shown in FIG. 2.

As can be seen in FIG. 2, the embodiment comprises an error correction component (ECC) 20 with an error correction mechanism (or self-correcting mechanism) in an EPN/CEP system 1. The error correction component 20 can be configured specifically for each event source 10 and/or input event stream, and is capable of correcting certain errors in the data streams such that event stream processing is error-free, scalable and efficient. Accordingly, CEP applications, in particular EPAs 40, do not have to bother with aspects of errors in "big data" and in the event-processing of the "big data". The errors are equally referred to as uncertainties in the following.

In one aspect, the configuration of error self-correction is achieved by specifying a configuration file for each event source 10. This configuration file comprises particularly an event type (event schema), as well as specifications, such as error correction parameters. The error correction parameters are essential for corrections, as will be explained further below. For example an error correction method can be comprised, such as event suppression, deterministic interpolation, etc. Preferably, the configuration file is managed in a central place, such as a repository 50. The configuration file is evaluated by the error correction component 20 of the EPN 1. If the error correction component 20 detects an error in the event sources 10, the specified error correction method in the configuration file is applied on the events and corrected event streams can be emitted. In particular, the errors can be corrected and new corrected events are emitted. Additionally or alternatively to the self-correction mechanism, the error correction component 20 might incorporate a monitoring mechanism. For example health monitoring events or error events can be generated and emitted whenever errors are detected. Exemplary error types that can be handled by certain example embodiments are listed in the following:

Missing event: The error occurs, if events that have occurred in reality are not reflected by an event object. Such an error can be detected without access to the details of the event source 10, if there is some indication that the event should have occurred, e.g. in the case of a sensor that continuously emits some sensor reading data as event (e.g. every 10 seconds). In this case, if there is a "gap" in the sensor reading events received by an error correction component 20 working on the corresponding channel 30, an error might have occurred. If the event stream emitted by the event source 10 is strictly ordered and the event metadata confirm a gap (e.g. by the event occurrence time stamp) rather than delayed delivery, an event has been lost, i.e. a "missing event" error has occurred. If there is no guarantee on delivery latency, a "missing event" error can be detected only when an event occurs that is to be expected after the missing one.

Invalid value sequence: This error occurs, if in a sequence of events in a stream emitted by event source 10, a certain attribute of the payload and/or of the header data is out of bounds, not only in its absolute value, but also in relation to the previous and/or subsequent value. As an example, consider a temperature sensor in a swimming-pool that emits a sensor reading event every second. The event payload contains a temperature event. If a reading has a significant difference to the previous ones (e.g. the last 1000 events indicated a temperature between 31.1 and 31.9 degrees, and now there is an event indicating 1.3 degrees), there is an erroneous value error, because the temperature in a swimming-pool cannot drop by 30 degrees within a second.

Invalid time sequence: Each event has an associated time stamp (indicating the time when the event has occurred). For many event sources 10, delivery of events is expected to be ordered by time stamp. For such event sources 10, an event sequence that is not ordered by time stamp is considered an invalid time sequence.

Impossible values: This error occurs if values are just out of the possible range, e.g. 300 degrees in the previous example.

Exemplary Implementation

Certain example embodiments comprise various parts, such as

A method for configuring error self-correction and a repository 50 to store the configurations An automatic error correction component 20

An optional error monitoring component

The Self-Correction Configuration

In one aspect, whenever a new event source 10 is to be added to an EPN 1, some configuration has to occur anyway, in order to fill the event channels 30 with the events from this source 10. In the prior art, an event schema is part of this configuration. Certain example embodiments extend and improve the configuration, as follows:

1) For each event source 10, general parameters can be specified, for example

- Sequencing expectations. These include for example:
  - i. an indication whether time-ordered event delivery is expected
  - ii. the maximum tolerated delivery delay times (in absolute values or as a percentage (referring to the average delivery times))
  - iii. the expected arrival rate (in system time)
    - A specification whether an error detected in the event source should lead to the emission of an error event (preferably on a dedicated error channel)
    - Grouping criteria for specifying which sequences of an event source are considered to be logically coherent. For example, if an event source comprise sensor readings from many different temperature sensors (where each of these has a unique ID), the grouping criterion would be the unique ID. Note that the grouping criteria refer to elements of the event type schema, but the criteria are not part of the event type definition, because they might be specific for each event source although different event sources might use to the same event type schema.

2) for each attribute of the payload, error correction parameters can be added, e.g.

- Allowed value range (note that such a configuration is different from e.g. specifying minimum and maximum values in a data type definition, because these would just cause an error on validation against the event type schema, whereas in certain example embodiments, we require a flexible handling)
- Allowed change rate (either in percentage or in absolute values). This denotes how much a value of the attribute in the event received at time t ($e_t$) may be different from the value of the same attribute in the immediately preceding event ($e_{t-1}$) of the same group. For some values, the specification of a distance-computing function has to be added, e.g. because the values have a non-scalar data type. For example, the change in a geographical location is quite naturally specified by the distance of the two locations. This distance then has to be computed based on two GPS coordinates. In general the signature of such a function is f(t,t)→ot, where t is the type of the values to be used for the computation (the first parameter gives the value from $e_{t-1}$, the second parameter that from $e_t$), and ot is the output type of the function (that can e.g. be specified along with the computation function, cf. XML representation below)
- Method for error correction, which may be a reference to a function. Such a function may take one or a plurality of events as input. The output of the function may be a corrected event of the same event type. For example, the corrected value may be determined by an extrapolation on the basis of the values of the previous events (e.g. the ten previous events). A value of an erroneous event which deviates too much from the previous events may be set to the maximal deviation to determine the correct value as one further example. A value of an erroneous event can be corrected based on any values of the previous events as another example. For example, a sensor might determine the position and speed of a vehicle and if the position and speed does not match in sequence (such as speed of 0 km/h and change of position of about 1 km in a second), a function can adjust one of the values (e.g. the position can be set to the position of the previous event). Other methods for error corrects are for example general resolution methods such as "ignore" (ignore the whole event), "previous" (replace the value in $e_t$ by that from $e_{t-1}$), or "interpolate" (using the values from $e_{t-1}$ and $e_{t-1}$, where $e_{t+1}$ represents the immediately following event in the same group).
- An expected distribution of the values (e.g. normal distribution, Gaussian distribution)

In another aspect, the event source configuration can be represented in XML in a preferred implementation (leaving out the prior art configuration that assigns an event source to a channel):

```
<EventSource   name="tempsensor 5634"
               xmlns="http://softwareag.com/channel"
               xmlns:tr="http://softwareag.com/event
               types/temperaturereading">
  <EmitChannelErrorEvent>true</EmitChannelErrorEve
  nt>
  <Timeordered>
      <CorrectionMethod>ignore</CorrectionMethod
      >
  </Timeordered><!- -events in this stream are
  expected to arrive in the sequence they were
  emitted -->
  <Arrivalrate unit="sec">10</Arrivalrate>
  <MaxDelay value="percentage">50</MaxDelay>
  <Value ref="tr:temperature">
      <Min>-30</Min> <!-- lower bound of allowed
      value range-->
      <Max>100</Max><!-- upper bound of allowed
      value range-->
      <MaxChange
      value="percentage">20</MaxChange> <!--
      maximum change 20%-->
      <MaxChange value="absolute">10</MaxChange>
      <!--maximum change 10-->
      <CorrectionMethod>interpolate</CorrectionM
      ethod>
  </Value>
  <Value ref="tr:location">
      <MaxChange value="absolute"
      computationFunction="distanceInKilometers(
      )">
           0.5
      </MaxChange> <!-- This is not a scalar
      value. This is why a computation function
      for computing the change value has to be
      specified. In this case, the function
      takes two location values as input
      (representing GPS coordinates) and
      computes the distance in kilometers -->
      <CorrectionMethod>previous</CorrectionMeth
      od>
  </Value>
  <Grouping>
      <Groupelement ref="tr:truckId"/>
      Gruppierung nach mehreren Attributen
      vorsehen
  </Grouping>
</EventSource>
```

In yet another aspect, the configuration file pertaining to event source 10 is preferably managed in a repository 50 which can be accessed by all components of the EPN 1.

The Error Correction Component 20

As shown in FIG. 3 whenever there is a self-correction configuration file for an event source 10 (step 1000), the event-based system, particularly CEP system 1, instantiates the error correction component 20 in an automated manner (step 1001). The error correction component 20 retrieves the self-correction configuration file (step 1002), preferably from a central place, the repository 50. Further, the error correction component 20 consumes the event stream which is emitted by an event source 10 (step 1003) and performs error correction. The error correction can be split without limitation into sequence check (step 1004) and value check (step 1005).

Sequence checking comprises the following aspects: the configuration file might comprise correcting parameters, such as the indication about time-ordered event delivery. Accordingly, the events are expected to be ordered by time stamps and to arrive in a correct time order. The error correction component 20 checks the correctness or violation based on the time stamps in the event. Thereby, the error correction component 20 can detect out-of-sequence events and the respective error invalid time sequence (step 1006). Additionally or alternatively, the error correction component checks for unexpected delay. Therefore the error correction component 20 computes the expected arrival rate by observing the events. If an arrival rate is explicitly specified, this is used as the expected arrival rate. If a delay of more than the specified tolerance is encountered, a violation is detected.

Value checking: The error correction component 20 internally splits the events received into groups if a grouping specification is comprised in the configuration. Otherwise, all events are considered to belong to the same group. The concept of grouping can be used also for sequence checking, e.g. with regard to the expected arrival rate. For each value of an event for which some error correction specification exists in the configuration, the various conditions of the configuration file are checked (e.g. valid range, valid amount of change compared to previous value etc., see above). If the error correction component 20 finds a violation of the conditions, a respective error is detected (step 1006).

If at least one error type is detected and a correction method is comprised in the configuration file, the method is applied on the input events (step 1007) and the errors are corrected (step 1008). For some error correction methods (e.g. interpolation), the value of the next event has to be known, hence the error correction component has to delay the emission of the corrected event in this case. Otherwise, distinct types of events can be generated and emitted (step 1009). For example, the event is either discarded (error correction method "ignore") or a corrected event is emitted. In any case, the corrected event stream is emitted in step 1011.

Further, the error correction component 20 of certain example embodiments is capable of learning about the "normal" behaviour of the value changes in a group. It can learn based on the received events (not the corrected ones), similar to machine learning. This can be applied with and without grouping. The improvement is that pattern in the event stream that are not obvious to the person creating the configuration file can be incorporated as well, e.g. certain value distributions. Based on this, abnormal behaviour could be added to the configuration for improved error correction. The abnormal behaviour can be detected based on this learning, i.e. the learned normal behaviour must be added to the configuration file. In particular, these can be specific to a group, i.e. they can be different from group to group in one event stream. This allows for a high flexibility and tailored handling.

Additionally or alternatively, each error detected might lead to the emission of a dedicated error event to a dedicated channel 30 specifying the error that has been detected in accordance with the configuration file (step 1010). If no error correction method is specified, this might nevertheless result in the emission of such an error (if configured), although no correction takes place. Thus, certain example embodiments can also be used just for monitoring the quality of event sources 10. Obviously, more error checks, error correction methods etc. can be added.

An exemplary XML representation of an error event indicating an error detected in a "temperature" value is as follows:

```
<EventSourceError eventSource="tempsensor 5634"
    xmlns:tr="http://softwareag.com/eventtypes/tempe
    raturereading"
    xmlns="http://softwareag.com/eventsourceerror">
    <error         ref="tr:temperature"
                   type="outOfBounds"
                   valueEncountered="234"
                   correctionMethod="interpolate"
                   correctedValue="7.9"/>
</EventSourceError>
```

The Error Monitoring Component

The error events can be consumed by error monitoring components, such as the one described in EP 13169119.8 of applicant.

In summary, certain example embodiments overcome the above described disadvantages of prior art, comprising for example the following benefits:

Not every developer of an event based application needs to be aware of the possible error situations, these can be dealt with by the domain experts who can configure the appropriate error handling and correction parameter once and at a single place, at the very place where the streams enter the event processing networks.

The knowledge about error handling is available and maintained in a central place, not distributed over many event processing agents which might even be under the control of different organizational units.

The one-by-one handling of streams ensures efficiency and scalability, which, with respect to the ever increasing amount of data sources processed in event processing networks (as it is discussed in the "Big Data" discussion nowadays), is essential.

A central concept of certain example embodiments lies in both the error correction and the advantages that the re-positioning of the error correction component brings to flexibility of what can be done at this earlier stage and the performance increase it brings. In addition, certain example embodiments are much more scalable than the prior art due to the positioning on each of the event streams.

While CEP is well known and increasingly mature area, the concept of error correction and in particular "self-correcting" has not been well addressed. In addition, certain example embodiments achieve more than just the self-correcting aspect in that scalability and efficiency have been improved. Certain example embodiments are not dependent on an XML solution, although this would be a current implementation of choice.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

What is claimed is:

1. A complex event processing system, comprising:
   a correction component, including at least one processor, configured to receive a stream of events comprising at least one event transmitted, over an event bus that is external to the correction component, from at least one event source to at least one event processing application configured to execute a continuous query on event streams transmitted over the event bus;
   wherein the correction component is interposed between the at least one event processing application and the at least one event source, is logically decoupled from the at least one event processing application and is configured to detect at least one error in the at least one event and to prevent erroneous events from being transmitted to the at least one event processing application by modifying such events so that they are either corrected prior to, or excluded from, onward transmission to the at least one event processing application; and
   wherein the correction component is configured to emit, over the event bus that is external to the correction component, a corrected stream of events comprising the at least one modified event that is subsequently processable by the at least one event processing application.

2. The system of claim 1, wherein the correction component is configured to detect the at least one error in the at least one event based on at least one configuration file specifying an expected behavior of the at least one event source, comprising an indication whether time-ordered event delivery is expected, a maximum tolerated event delay time and/or an expected arrival rate of events.

3. The system of claim 1, wherein the correction component is configured to detect the at least one error in the at least one event based on at least one configuration file specifying at least one error correction parameter for the at least one event, comprising an allowed value range, an allowed change rate and/or an expected value distribution.

4. The system of claim 2, wherein the at least one configuration file further specifies at least one error correction method to be applied by the correction component, comprising a reference to a function for calculating at least one corrected event, ignoring at least one event, replacing at least one erroneous value of at least one event with at least one value of a previous event and/or generating at least one interpolated value for at least one event.

5. The system of claim 1, wherein at least one configuration file is stored in a repository.

6. The system of claim 2, wherein the at least one configuration file specifies a grouping of events, and wherein the correction component is configured to apply an error correction method on the grouping of events.

7. The system of claim 1, wherein the correction component is further configured to emit at least one error event indicating that at least one error in the stream of events was detected, wherein the at least one error event is consumable by a monitoring component.

8. The system of claim 2, wherein the at least one event and/or the at least one configuration file is XML based.

9. The system of claim 2, wherein the correction component is configured to adapt the at least one configuration file based on the corrected stream of events and/or the at least one error event.

10. A method for correcting events in a stream of events in a complex event processing (CEP) system performed by a correction component operating under the control of processing resources including at least one processor, the method comprising:
    receiving, by the correction component, a stream of events comprising at least one event transmitted, over an event bus that is external to the correction component, from at least one event source to at least one event processing application configured to execute a continuous query on event streams transmitted over the event bus, wherein the correction component is interposed between the at least one event processing application and the at least one event source and is logically decoupled from the at least one event processing application;
    detecting, by the correction component, at least one error in the at least one event;
    preventing erroneous events from being transmitted to the at least one event processing application by modifying the at least one event in which the at least one error is detected so that the at least one event is either corrected prior to, or excluded from, onward transmission to the at least one event processing application; and
    emitting, by the correction component over the event bus, a corrected stream of events comprising the at least one modified event that is subsequently processable by at least one event processing application.

11. The method of claim 10, wherein the detecting is performed based on at least one configuration file specifying an expected behavior of the at least one event source, comprising an indication of whether time-ordered event delivery is expected, a maximum tolerated event delay time and/or an expected arrival rate of events.

12. The method of claim 11, further comprising applying, by the correction component, at least one error correction method based on at least one configuration file specifying the at least one error correction method to be applied by the correction component, comprising a reference to a function for calculating at least one corrected event, ignoring at least one event, replacing at least one erroneous value of at least one event with at least one value of a previous event, and/or generating at least one interpolated value for at least one event.

13. The method of claim 11, further comprising applying, by the correction component, at least one error correction method on a grouping of events that is specified in the at least one configuration file.

14. The method of claim 10, further comprising emitting, by the correction component, at least one error event indicating that at least one error in the stream of events was detected, wherein the at least one error event is consumable by a monitoring component.

15. A non-transitory computer readable storage medium tangibly storing a computer program for correcting events in a stream of events in a complex event processing (CEP) system, the program comprising instructions that, when executed by a correction component operating under the control of processing resources, perform functionality comprising:

receiving, by the correction component, a stream of events comprising at least one event transmitted, over an event bus that is external to the correction component, from at least one event source to at least one event processing application configured to execute a continuous query on event streams transmitted over the event bus, wherein the correction component is interposed between the at least one event processing application and the at least one event source and is logically decoupled from the at least one event processing application;

detecting, by the correction component, at least one error in the at least one event;

preventing erroneous events from being transmitted to the at least one event processing application by modifying the at least one event in which the at least one error is detected so that the at least one event is either corrected prior to, or excluded from onward, transmission to the at least one event processing application; and emitting, by the correction component over an event bus that is external to the correction component, a corrected stream of events comprising the at least one modified event that is subsequently processable by the at least one event processing application.

16. The system of claim 1, wherein the correction component is decoupled from queries executable by the at least one event processing application.

\* \* \* \* \*